Feb. 5, 1957
G. H. CORK
2,780,080
UNIVERSAL JOINT
Filed Aug. 19, 1953
4 Sheets-Sheet 1
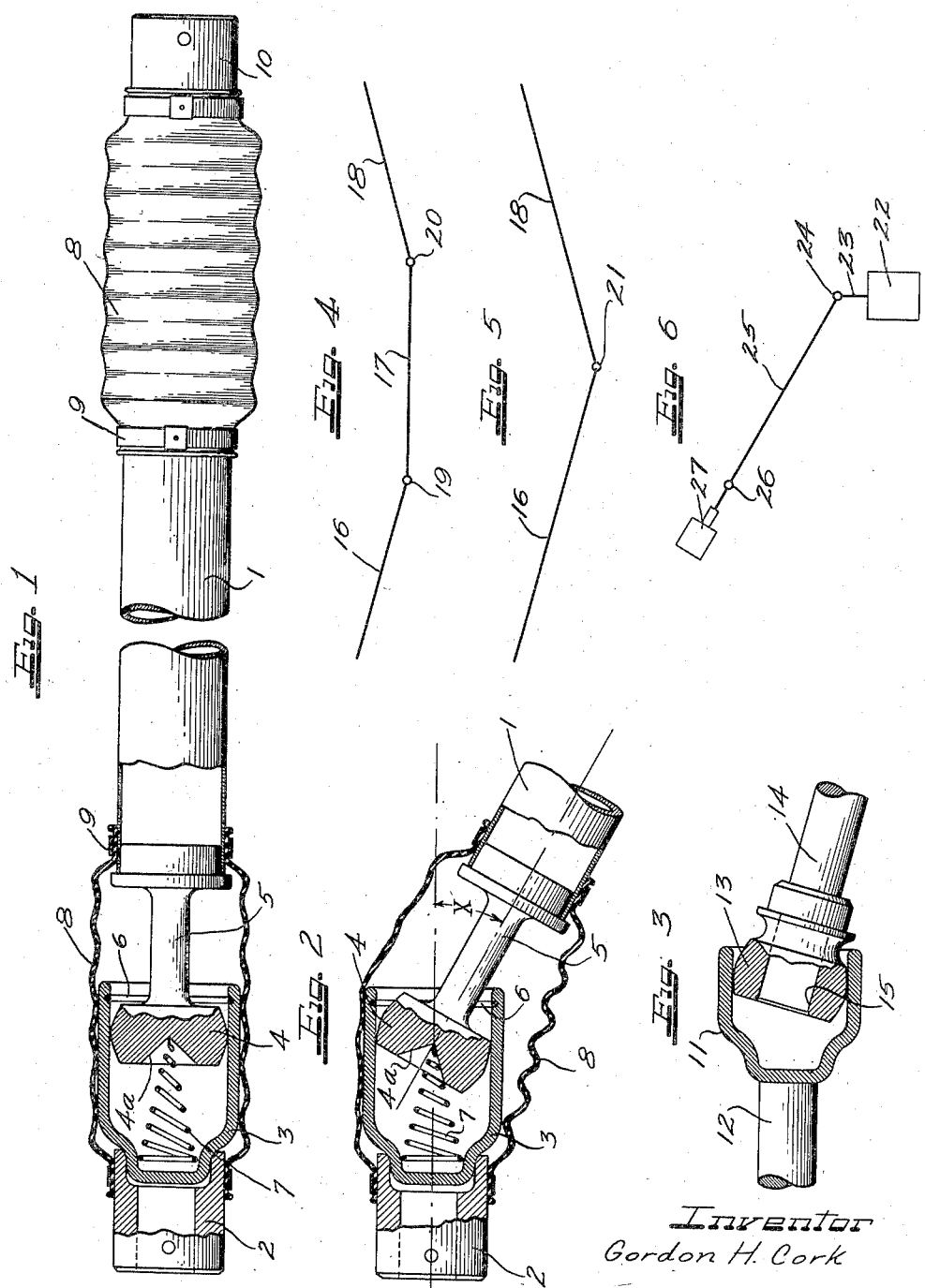
Inventor
Gordon H. Cork Inventor
Gordon H. Cork Feb. 5, 1957  G. H. CORK  2,780,080
UNIVERSAL JOINT
Filed Aug. 19, 1953  4 Sheets-Sheet 3

Inventor
Gordon H. Cork
Attys.

Feb. 5, 1957 G. H. CORK 2,780,080
UNIVERSAL JOINT
Filed Aug. 19, 1953 4 Sheets-Sheet 4

Inventor
Gordon H. Cork

United States Patent Office 2,780,080
Patented Feb. 5, 1957

2,780,080

UNIVERSAL JOINT

Gordon H. Cork, Birmingham, Mich., assignor to Process Gear and Machine Company, Detroit, Mich., a corporation of Michigan Application August 19, 1953, Serial No. 375,261

3 Claims. (Cl. 64—21)

This invention relates to improvements in a universal joint, and more particularly to a universal joint of the so-called ball and socket type, although the invention, as to its fundamental principles, might be associated with universal joints of other types, as will be apparent to one skilled in the art.

In the past, many and various types of universal joints have been developed. The most popular of these joints, insofar as usage is concerned, is the Hookes or cross-type joint. This joint is objectionable for numerous reasons, but its popularity in use is due to its economy of construction. The cross-type joint is clearly the farthest away from constant velocity of substantially any universal joint; it is lacking in efficiency; it has little grease capacity; it has poor load-carrying capacity for size of joint; it has considerable backlash; it is short-lived, especially when operating at a relatively large angle between the shafts; it requires splining of the shaft adjacent but external to each joint; and in many installations, a plurality of cross-type joints must be used in order to get a proper connection that should desirably be established with only one universal joint. Some constant velocity joints have been developed, of which the Rzeppa and the Weiss joints are commonly recognized as the most accurate in that regard. These joints, however, are prohibitively expensive for common usage, particularly in the farm machinery and automotive fields of endeavor.

Some universal joints of the so-called ball and socket type have heretofore been developed, at least to the constructive reduction to practice stage. That is, certain patents have been issued upon them. Those joints embodied a socket on the end of one shaft, and a head or knuckle, the so-called ball, on the end of the other shaft. Both the socket and ball were complementally polygonal in cross-section and in certain instances the socket had plane faces inside. Each face of the ball, in devices of this character heretofore known, was cylindrical, some having a center at the axis of the shaft, some having a longer radius, and in one instance each face of the ball was cylindrical in both directions; i. e., there was a curvature both laterally and longitudinally of the face, but throughout the curvature was around the same radius. In several cases, these devices were correctly designated as shaft couplings, and might prove feasible for coupling adjacent ends of shafts very slightly out of exact alignment. But, because of the faces on the knuckle being cylindrical, not any of these devices would function as a universal joint, except possibly with a deviation of one shaft from alignment with the other to the extent of an extremely few degrees. Otherwise, wedging of the knuckle and the socket would occur, and the so-called joint would break. So far as I am aware, there never has been an operable universal joint of the ball and socket type, wherein only one socket and one knuckle was used in the joint. There has certainly been no such construction heretofore that even reasonably approached constant velocity, or which permitted one shaft being out of alignment with the other at a predetermined angle in any direction up to 45°.

With the foregoing in mind, it is an important object of the instant invention to provide a simple form of universal joint that operates at substantially constant velocity.

Another object of the invention is the provision of a universal joint that compares favorably in operation with the expensive constant velocity joints heretofore developed, and which may be manufactured extremely economically.

Also an object of the invention is the provision of a simple form of universal joint providing greater efficiency in proportion to its size and cost than joints heretofore known.

Still another feature of this invention resides in the provision of a universal joint of simple construction which has more load capacity in proportion to its size than joints heretofore known.

Another feature of the invention resides in the provision of a simple form of universal joint having a large grease capacity.

Still another object of the invention resides in the provision of a universal joint, very simple in design, embodying few parts, economical to manufacture, and which is very long-lived and durable.

It is a highly important object of the instant invention to provide a universal joint embodying a knuckle on the driving or driven shaft, which knuckle is provided with operating faces generated conjugately to the surfaces which they contact in operation.

Another feature of the invention resides in the provision of a universal joint embodying a knuckle member provided with operative faces formed each with a contour in keeping with the ultimate movement of the joint in actual operation.

It is a still further object of the instant invention to provide a universal joint of the ball and socket type which is operative.

Still another feature of the invention resides in the provision of a universal joint of the so-called ball and socket type, in which a socket on one shaft and a knuckle on the other shaft are the salient parts of the joint, and in which no shaft splining adjacent the joint is necessary.

Also an object of the invention resides in the provision of a universal joint of the ball and socket type, embodying a knuckle provided with contact faces which may be generated or formed for a predetermined maximum operating angle of deviation in shaft alignment, from 0° to 45°.

Still another feature of the invention resides in the provision of a universal joint of the ball and socket type in which the ball or knuckle element may readily be shaped to provide adequate lubrication during operation.

It is also a feature of the invention to provide a universal joint of the ball and socket type in which the knuckle element may be made extremely light in weight without loss of strength.

While some of the more salient features, characteristics and advantages of the instant invention have been above pointed out, others will become apparent from the following disclosures, taken in conjunction with the accompanying drawings, in which:

Figure 1 is a fragmentary part elevational, part central sectional view of a shaft assembly including a universal joint embodying principles of the instant invention;

Figure 2 is a fragmentary part elevational, part sectional view of the left-hand portion of Figure 1, showing the joint with a definite angle between the shafts;

Figure 3 is a fragmentary part sectional, part elevational view of a joint of slightly different form, embodying principles of the instant invention;

Figure 4 is a diagrammatic sketch, utilized for comparison purposes;

Figure 5 is also a diagrammatic sketch utilized for comparison purposes with the structure of Figure 4;

Figure 6 is another diagrammatic sketch utilized to illustrate an advantage of the present invention;

As shown on the drawings:

Figure 7:
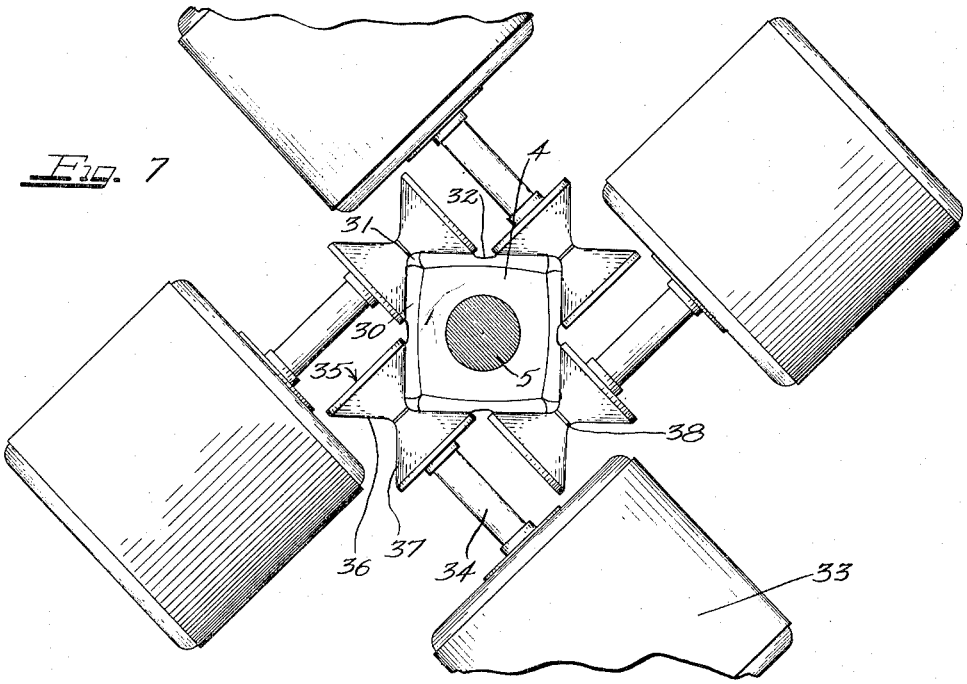
Figure 7 is a fragmentary part elevational part sectional view showing mechanism for generating the operating faces on the knuckle utilized in the instant invention.

For clarity and better understanding of the instant invention, I will at this point give several definitions of the meanings of words used herein and in the appended claims.

The term "generate" is herein used in the sense it is most generally used in connection with gear teeth, to indicate forming with theoretical accuracy.

The "angle of generation" or "generated angle" signifies the maximum angle of deviation of one shaft from direct alignment with the other shaft for which the joint is initially designed. For example, the angle X seen in Figure 2 is the generated angle, assuming that the maximum deviation from shaft alignment at which the joint will successfully operate is there present.

The term "conjugate" is also used in the sense it is most frequently used in connection with gear teeth, to signify that one part will drive the other part or be driven thereby with a constant velocity ratio.

Later herein, where the term "cone angle" is used in explaining the method of providing contact faces, that is to be considered the angle at the vertex of a cone between diametrally opposed elements of the cone, and that angle will be twice the angle of generation.

It is apprehensible that the generated surfaces hereinafter discussed may be on one or the other members of the joint, that is, in the socket member or on the knuckle member, and herein and in the appended claims the invention is not to be considered limited to either member specifically, especially as to the broad aspects of the invention. Usually it will be found more convenient and more economical to provide the generated surfaces on the knuckle member, and the invention is so described herein.

With reference now to Figure 1, I have shown a shaft assembly of a character that may be utilized as the torque rod assembly of an automotive vehicle, as the so-called auger drive assembly for an agricultural machine, or in other locations, as will be apparent to one skilled in the art.

In this arrangement, a universal joint is associated with each end of a tubular torque shaft 1. Such joints may be alike in character, and each is of the ball and socket type. In the illustrated showing, a shaft coupling 2, which may be considered the shaft itself, is connected as by welding to a socket member 3. This socket member is polygonal in cross-section, as will more fully later appear, and as clearly seen in Figure 12 of the drawings. Disposed inside the socket member, and preferably intimately fitting therein, is a head or knuckle 4, also polygonal in cross-section complementally to the socket member, and which is broadly referred to as the "ball." This knuckle is connected by a neck 5 to the adjacent end of the torque shaft 1. The neck 5 is disclosed as small in diameter so that the parts of the joint may be assembled in a confined space and at a sharp angle to each other. A spring ring 6 seated in a suitable groove in the socket 3 may be utilized to prevent unintentional removal of the knuckle from the socket. Since there is a joint at each end of the torque shaft 1, a conical shaped compression spring 7 is disposed in the socket, and the outer end of the spring seats dead center at the apex of the conical recess 4a in the knuckle 4 so as to eliminate wear.

During operation, the knuckle 4 will move back and forth inside the socket, thus eliminating the necessity of splining any of the shafts adjacent the joint, and the spring 7 in each joint at the end of the torque rod 1, maintains the torque rod in a position of balance.

The joint proper is enclosed in a flexible boot 8 of synthetic rubber or equivalent material, which is clamped around each shaft by any suitable means such as a band 9. Of course, lubricant of a suitable character is placed inside the boot.

Identically the same joint with the same arrangement may be provided at the other end of the torque rod 1, and the socket member of the second joint is connected to a shaft coupling 10. Thus it will at once be apparent that either the socket member or the knuckle member of the joint may be the driven member or may be the driving member. For example, assuming that the shaft coupling 2 is driven, then the socket 3 is the driving member and the knuckle 4 is the driven member of the left-hand joint, but on the right-hand joint the knuckle will be the driving member and the socket the driven member.

In Figure 2 I have illustrated the joint in position with the shafts at a definite angle to each other. If the angle X is the angle for which the faces on the knuckle 4 were generated, then the joint is in the maximum angular position for operation, but obviously will operate at any angle between the angle X and 0° or shaft alignment. As will more fully appear later herein, the joint operates smoothly, freely, with high efficiency, great load-carrying capacity for its size, and very closely approaches constant velocity.

In Figure 3 I have illustrated a similar joint but of slightly different form. In this instance, a polygonal socket 11 is connected with a shaft 12 and a complementally polygonal knuckle 13 is connected to a shaft 14. No retainer such as the ring 6 is necessary, where the shaft 14 does not have a joint at the other end thereof, and likewise no compression spring 7 is necessary under those circumstances. In this instance, however, in order to lighten the weight of the knuckle, an internal bore 15 has been provided. This bore does not interfere with the strength of the knuckle or its operation, but merely lessens the overall weight of the joint. In this showing, the boot has been eliminated for purposes of clarity. The joint of Figure 3 will operate in the same manner and give the same results as the joint seen in Figures 1 and 2.

In order to more adequately set forth the advantages of the instant invention, in Figures 4, 5 and 6 I have presented diagrammatic sketches for that purpose. In view of the fact that the cross-type joint is more commonly used, the instant invention will be compared to that joint insofar as these figures are concerned.

In Figure 4 I have indicated three shafts 16, 17 and 18, with two cross-type joints 19 and 20 connecting adjacent ends of the shafts. Now with the angle between shaft 16 and shaft 17 exactly the same as the angle between shaft 17 and shaft 18, the two Hookes or cross-type joints 19 and 20 together will provide constant velocity, assuming that the pins of those cross-type joints are set at the right relative angles. That is the only circumstance, however, wherein constant velocity can be obtained with a cross-type joint, and it will be noted particularly that two joints are necessary to acquire it even under these circumstances. Further, it will be obvious that a splining arrangement must be provided in one or the other shafts adjacent each joint.

With reference to Figure 5, it will be seen that with a joint of the type shown in Figures 1 to 3, inclusive, the shaft 16 may be lengthened, and the shaft 18 may be lengthened, and a single joint 21 utilized between them. The shaft 17 may be entirely eliminated, thus saving considerable space. Likewise, all splining arrangements may be eliminated. One universal joint has also been eliminated. Yet, the structure of Figure 5 will give the same results as the arrangement shown in Figure 4, and with substantial constant velocity. Obviously, there is a considerable saving in cost, ease of assembly, and in the space required to connect shafts 16 and 18.

Now constant velocity joints of the character heretofore known could not be substituted for the joint 21 of Figure 5 with any reasonable degree of economy, because those joints are prohibitively expensive, and also require shaft splining.

In Figure 6 I have illustrated another comparison sketch wherein a driving gear box 22 has a drive shaft 23 projecting therefrom, connected by a universal joint 24 to a sloping shaft 25, in turn connected by a universal joint 26 to a driven mechanism 27. It will be noted that normally the entire angle between the shafts 23 and 25 is taken up by the joint 24, since without any jars, vibrations, or the like provided by rough terrain, the shaft 25 is in direct alignment with the driven load 27. Under these circumstances, if a cross-type joint were utilized at 24 that joint would be extremely short-lived. However, a joint of the character shown in Figures 1 to 3, inclusive, may be utilized at 24 and have indefinite duration. It will also be noted that should any joint, constant velocity or otherwise, be substituted for the instant invention at 24, shaft splining would be necessary.

With reference now to Figures 7 to 12, inclusive, the character of operating faces on the knuckle member, and the method of providing those faces will be described. For clarity, the socket 3 and knuckle 4 will be discussed, although identically the same is true in connection with the socket 11 and knuckle 13 of Figure 3.

Figure 8:
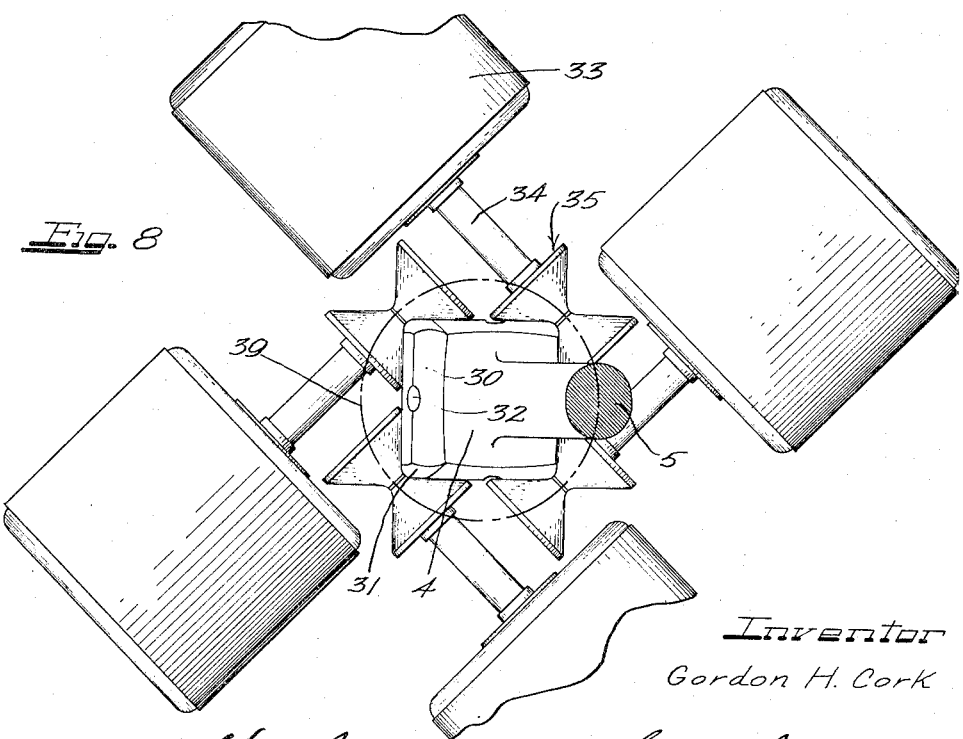
Figure 8 is a view similar in character to Figure 7, but illustrating the method of generating the contact faces on the knuckle member of the joint.
Figure 12:
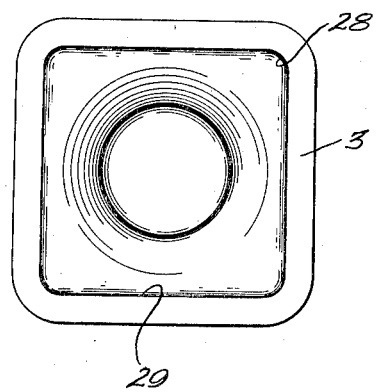
Figure 12 is an end elevational view of the socket member of the joint.

In the iluustrated instance the socket is illustrated as substantially square, that is a four-sided polygon in cross-section with slightly rounded interior corners 28, as seen in Figure 12. Thus the socket is provided interiorly with four faces 29, and each of these faces is a plane surface. The knuckle 4 is also provided with four faces 30 and with slightly rounded corners 31, as seen in Figures 7 and 8. It will be distinctly understood, however, that the number of faces on the ball and surfaces in the socket is not critical. Usually, for ease of manufacture and durability there will be between three and eight faces, an odd number functioning the same as an even number.

Since, in actual operation, the center point of each face on the ball does little or no work whatever, that center portion or area may be slightly recessed as indicated at 32 in an exaggerated manner to permit the passage of lubricant from one side of the knuckle to the other when the knuckle moves backwardly and forwardly inside the socket. This prevents the knuckle from acting as a piston and insures adequate lubrication.

The knuckle 4 may be initially formed to approximately the desired size and shape in order to reduce as much as possible the cutting operation on the faces during the generation of these faces. The faces may be generated one at a time, if so desired, but I have indicated in Figures 7 and 8 an arrangement whereby all of the faces are generated at the same time. To this end, there is provided four identical cutting means, each comprising a driving element such as a motor 33, a shaft 34, and a cutting tool 35. Each cutting tool 35 is generally of hourglass shape, and includes a pair of truncated conical cutting members 36 and 37, with a washer, spacer or the like 38 disposed between the small ends thereof. Preferably, the cutting elements 36 and 37 provide a straight line cut or cutting contact against the knuckle 4. As seen in Figure 7, with this arrangement each cutting element generates one-half a face on the knuckle. The cutting tools are located at the corners of the knuckle so that the element 36 of one tool 35 generates half a face on the knuckle, while the element 37 on the same tool generates half an adjacent face. It is not necessary for any tool to cut in the vicinity of the lubricant-passing recess 32 in each face of the knuckle, although it will be understood that if a recess is not desired in the knuckle face, a single cutting tool may generate an entire face.

During the generation of the faces, a cutting tool does not move except by way of rotation on its own axis. The knuckle is held against rotation about its own axis, and by any suitable mechanism is gyrated or oscillated so that its axis defines an imaginary cone, indicated by the dotted line 39 in Figure 8, the apex of this imaginary cone being preferably at the center of the knuckle or head 4, although in some instances that is not an essential. The cone angle of the imaginary cone will be twice the generated angle of the knuckle, so that half the cone angle is the maximum angle of deviation from alignment with the socket shaft for which that particular knuckle is intended to operate satisfactorily. The generated angle may be anything desired from 0 to 45°.

It will be especially noted that by this method of forming the knuckle faces, each face is generated conjugately to a plane surface, the line contact with the cutting element acting as the plane surface. During generation, the knuckle is given a movement in simulation of the movement it will have in actual usage. Therefore, assuming perfection in the mechanical work, a joint of the character seen in Figures 1 to 3, inclusive, must provide constant velocity at the generated angle, as well as at 0°. The joint may vary slightly, and in most cases that will be but a very slight variation, from constant velocity at angles intermediate 0° and the generated angle. That slight variance from constant velocity in the intermediate region may be considerably reduced by providing more faces on the knuckle.

At this time it may be best to mention that the socket may be a stamping or drawing, while the knuckle is preferably a forging. It will be understood, however, that the invention also contemplates casting of the knuckle, such as die-casting. In that event, a pattern knuckle would be generated in the manner above described, and the die molds made from such a pattern. That particular manner of procedure is sufficiently known as to warrent no illustration of the dies herein.

As a result of the generation process of forming the faces on the knuckle, these faces are not cylindrical. The faces might be described, for want of better terms, as variably curvate in both directions. That is, each face is generally curvate laterally of the knuckle and longitudinally of the knuckle, but in no case does the curvature follow the arc of a true circle, and the curvature in different portions of a face is not the same as the curvature in other portions.

As a result, it is practically impossible to properly illustrate the exact character of a face on the knuckle. However, in Figures 9, 10 and 11, in order to make as full as possible a disclosure herein, I have set up proportionate dimensions of the knuckle face, for a knuckle having an angle of generation of 30°. The actual dimensions of the knuckle and socket will, of course, vary in accordance with the amount of load the joint is to carry. Accordingly, dimensions will only be given as proportions of an original dimension.

Therefore, I have indicated the maximum width of the knuckle transversely to the shaft axis as W, and this is the width from the high center point of one face to the high center point of an opposite face, before the lubricant-passing recesses 32 have been provided. Moving over half way to the edge along the center of the face, a distance of one-fourth W, we have a dimension $W_1$ which is 99.6% of W. Then moving clear to the side edge of the joint, we have a dimension $W_2$ which is approximately 98.9% of W. The forward edge of the knuckle will, of course, be the same size as the rear edge of the knuckle where it joins the shaft or neck 5. The widest dimension at the forward edge has been designated L and this is approximately 91% of W. Half way to the side we have the dimension $L_1$ which is approximately 89% of W; and at the edge we have the deminsion $L_2$ which is approximately 86.6% of W.

Figure 10:
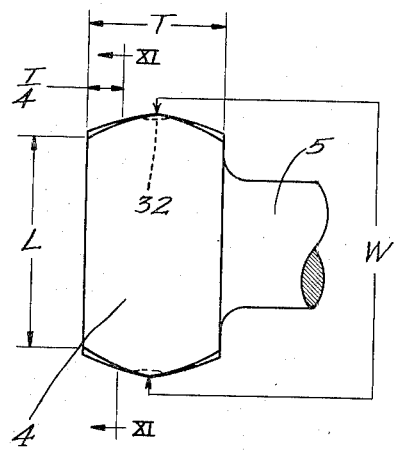
Figure 10 is a side elevation of the knuckle member, also diagrammatically indicating proportional dimensions.

Now with reference to Figure 10, the dimension T indicates the thickness of the knuckle, and that thickness varies with the angle of generation. A small angle of generation does not require much thickness to have proper contact of the knuckle with the socket, but as the angle of generation increases, the thickness of the knuckle must increase in order to insure proper contact with the socket. This demension T is therefore not proportional to the dimension W. In this Figure 10 I have indicated the section line for Figure 11, which is half way from the center of the face to the forward edge of the face, or one-fourth T.

Figure 11:
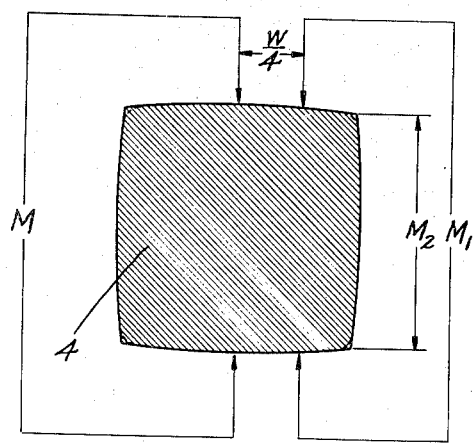
Figure 11 is a transverse vertical sectional view taken substantially as indicated by the line XI—XI of Figure 10, looking in the direction of the arrows, and also diagrammatically indicating proportional dimensions.

In Figure 11, the dimension M will indicate the maximum width of the knuckle half way between the forward edge and the center, and this dimension M is approximately 97% of W. Half way between M and the adjacent side edge of the knuckle, we have a dimension $M_1$, which is approximately 96.4% of W; and at the edge the dimension $M_2$ is approximately 94% of W.

All proportional dimensions given herein are approximate, consistent with mechanical errors.

Figure 9:
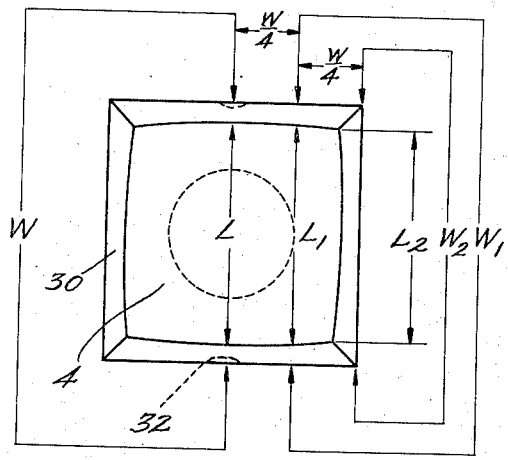
Figure 9 is an end elevational view of the knuckle member of the joint diagrammatically indicating proportional dimensions.

As stated above, the showings in Figures 9, 10 and 11 are for the purpose of indicating the character of the faces on the knuckle, but these particular proportionate dimensions are not essential in the manufacture of the universal joint, because if the faces on the knuckle are generated in the manner above described, the joint will operate, whether or not the approximate proportional dimensions are known to the operator.

Figure 13:
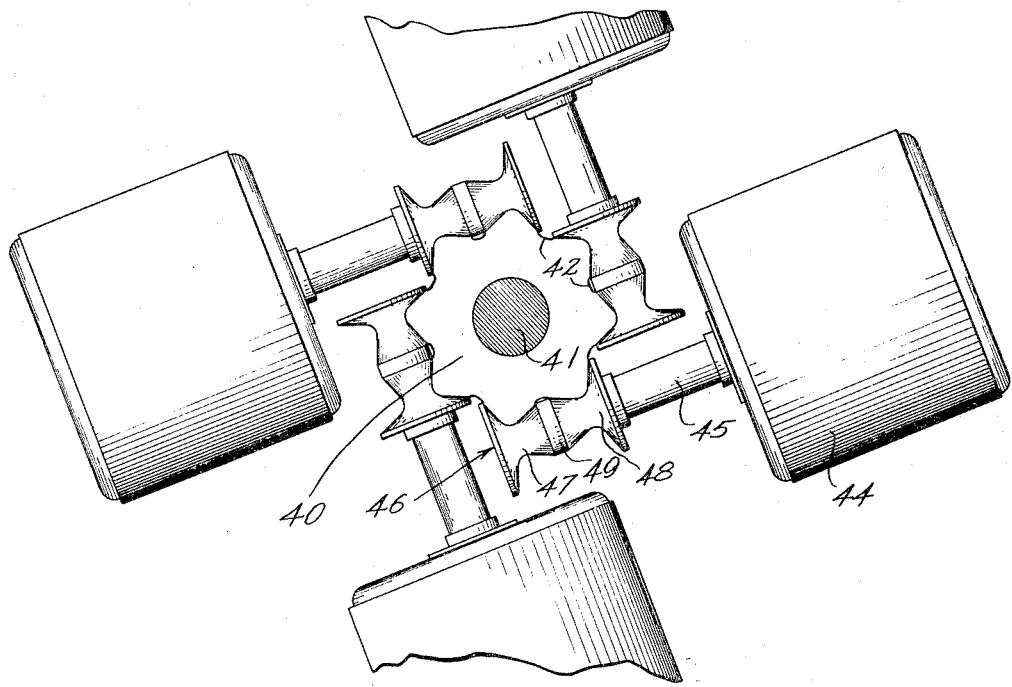
Figure 13 is a view similar in character to Figures 7 and 8, illustrating mechanism for generating contact faces on a knuckle member having more faces than the member shown in Figures 7 and 8.
Figure 14:
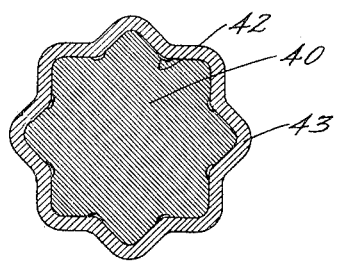
Figure 14 is a transverse vertical sectional view of the knuckle member of Figure 13, showing the same in a corresponding socket.

As stated above, the slight deviation from constant velocity that may occur somewhere between 0° and the generated angle of the knuckle may be materially lessened by increasing the number of faces on the knuckle. To this end I have illustrated in Figures 13 and 14 a knuckle having the general cross-section of an octagram and which may be termed an eight-faced knuckle, each face being fluted or angled inwardly to a lubricant-passing recess. The knuckle is indicated at 40, with a neck 41, and the lubricant recesses at 42. In Figure 14, a fluted socket 43 encasing the knuckle is disclosed, the socket being, of course, complemental in shape to the knuckle. Looking again at Figure 13, the means for generating such a knuckle would comprise four sets of generating mechanism, each set including a motor 44, a shaft 45, and a cutting tool 46. Each cutting tool consists of a pair of confronting urn-shaped cutting elements 47 and 48, with a suitable spacer 49 therebetween. During the generation of the faces, the knuckle 40 is gyrated in the same manner as above described in connection with Figure 8.

For agricultural machinery, a knuckle with four faces is quite sufficient and satisfactory, and for most uses of universal joints, a knuckle having four or six faces is quite satisfactory and substantial constant velocity is obtained. The structure illustrated in Figures 13 and 14 would be most frequently used for highly specialized accurate machinery where the cost of the universal joint would be secondary in consideration, and the constant velocities desired to an extremely close tolerance.

From the foregoing, it is apparent that I have provided a universal joint, extremely simple in construction, embodying few parts, long-lived, economical to manufacture, and one which provides substantially constant velocity.

It will be understood that modifications and variations may be effected without departing from the scope of the novel concepts of the present invention.

I claim as my invention:

1. A constant velocity universal joint having a driving member, and a driven member rotatable by said driving member, said driving and driven members having conjugate contact faces forming the driving connection therebetween, the faces of one of said members each being defined by curved surfaces which intersect in a plane perpendicular to the shaft axis and which intersection is curved about an axis parallel to the shaft axis and each of said surfaces being curved about an axis parallel to the shaft axis and said parallel axis and located between those axes.

2. A constant velocity universal joint having a driving member, and a driven member rotatable by said driving member, said driving and driven members having conjugate contact faces forming the driving connection therebetween, the faces of one of said members each being defined by curved surfaces which intersect in a plane perpendicular to the shaft axis and which intersection is curved about an axis parallel to the shaft axis and each of said surfaces being curved about an axis parallel to the shaft axis and said parallel axis and located between those axes, said universal joint being operable with the axes of the driving and driven members out of alignment in excess of ten degrees.

3. A universal joint having a driving member, and a driven member rotatable by said driving member, said driving and driven members having generated conjugate contact faces forming the driving connection therebetween, the faces of one of said members each being defined by irregularly curved surfaces which intersect in a plane perpendicular to the shaft axis and which intersection is curved about an axis parallel to the shaft axis and each of said surfaces being curved about an axis parallel to the shaft axis and said parallel axis and located between those axes.

References Cited in the file of this patent

UNITED STATES PATENTS

| 1,034,453 | Hubbell | Aug. 6, 1912 |
| 1,287,030 | Jones | Dec. 10, 1918 |
| 1,700,991 | Wintercorn | Feb. 5, 1929 |
| 2,304,666 | Sturges | Dec. 8, 1942 |